US 11,981,389 B1
United States Patent
Kim et al.

(10) Patent No.: US 11,981,389 B1
(45) Date of Patent: May 14, 2024

(54) COMPACTABLE VEHICLE (71) Applicant: Honda Motor Co., Ltd., Tokyo (JP)

(72) Inventors: Michael Jin Kim, Long Beach, CA (US); Jackie P Porchay, Torrance, CA (US)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 18/168,788

(22) Filed: Feb. 14, 2023

Related U.S. Application Data (63) Continuation of application No. 16/894,456, filed on Jun. 5, 2020, now abandoned.

(51) Int. Cl.
| | |
|---|---|
| *B62K 15/00* | (2006.01) |
| *B62J 25/06* | (2020.01) |
| *B62J 45/00* | (2020.01) |
| *B62J 45/20* | (2020.01) |
| *B62K 11/04* | (2006.01) |
| *B62K 11/14* | (2006.01) |
| *B62K 21/24* | (2006.01) |

(52) U.S. Cl.
CPC ............... *B62K 15/00* (2013.01); *B62J 25/06* (2020.02); *B62J 45/00* (2020.02); *B62J 45/20* (2020.02); *B62K 11/04* (2013.01); *B62K 11/14* (2013.01); *B62K 21/24* (2013.01); *B62K 2202/00* (2013.01)

(58) Field of Classification Search
CPC ........ B62K 15/00; B62K 11/04; B62K 11/14; B62K 21/24; B62K 2202/00; B62J 25/06; B62J 45/00; B62J 45/20
See application file for complete search history.

(56) References Cited

U.S. PATENT DOCUMENTS

| | | | |
|---|---|---|---|
| 586,307 | A | 7/1897 | Dickson |
| 661,563 | A | 11/1900 | Stockford |
| 2,194,161 | A | 3/1940 | Cobb |
| 2,554,292 | A | 5/1951 | Brown |
| 3,316,993 | A | 5/1967 | Weitzner |

(Continued)

FOREIGN PATENT DOCUMENTS

| | | |
|---|---|---|
| CN | 101870324 B | 5/2012 |
| CN | 204323613 U | 5/2015 |

(Continued)

OTHER PUBLICATIONS

Joey Haar, "The Proposed Audi eSuitcase Folds Out to Become a Two-Wheeled Ride", Trendhunter, Retrieved from https://www.trendhunter.com/trends/scooter-suitcase, Jul. 30, 2016, 05 pages.

(Continued)

*Primary Examiner* — Drew J Brown
(74) *Attorney, Agent, or Firm* — Plumsea Law Group, LLC (57) ABSTRACT

A compactable vehicle is provided. The vehicle includes a body, a steering assembly coupled to the body, and a seating assembly coupled to the body. The steering assembly includes a wheel assembly, an elongated structure retractably coupled to the body, and a handlebar. The elongated structure includes a first end, a second end coupled to the wheel assembly, and a slot that extends between the first end and the second end. The handlebar is pivotally disposed in the slot. The seating assembly includes a support member retractably coupled to the body and a seat pivotally coupled to the support member.

20 Claims, 8 Drawing Sheets

(56) References Cited

U.S. PATENT DOCUMENTS

| | | |
|---|---|---|
| 4,598,923 A | 7/1986 | Csizmadia |
| 5,097,922 A | 3/1992 | Stagi |
| 6,273,442 B1 | 8/2001 | Fallon et al. |
| 7,077,229 B2 | 7/2006 | Lee |
| 7,097,407 B2 | 8/2006 | Kurohori et al. |
| 7,954,831 B1 | 6/2011 | Yeh |
| 8,348,294 B1 | 1/2013 | Moldestad |
| 8,876,128 B2 | 11/2014 | Moldestad |
| 9,061,726 B2 | 6/2015 | Moldestad |
| 9,266,579 B2 | 2/2016 | Yap |
| 9,302,728 B1 | 4/2016 | Yang |
| 9,422,022 B2 | 8/2016 | Sharkan |
| 9,896,148 B2 | 2/2018 | Baba |
| 10,053,179 B2 | 8/2018 | Xie |
| 10,407,119 B1 | 9/2019 | Greenberg |
| 2011/0187077 A1 | 8/2011 | Appleman |
| 2012/0013101 A1 | 1/2012 | Huang et al. |
| 2013/0048401 A1 | 2/2013 | Kim |
| 2015/0158433 A1 | 6/2015 | Watanabe et al. |
| 2018/0015978 A1 | 1/2018 | Delgatty et al. |
| 2018/0290046 A1* | 10/2018 | Quaglia .................. B62K 21/12 |
| 2019/0202519 A1 | 7/2019 | Etzelsberger et al. |
| 2019/0382067 A1 | 12/2019 | Mühle et al. |
| 2019/0382072 A1 | 12/2019 | Allen |
| 2020/0185939 A1 | 6/2020 | Gladstone et al. |
| 2021/0053648 A1* | 2/2021 | Cordero .................. B62K 19/40 |
| 2022/0161885 A1 | 5/2022 | Praveen |

FOREIGN PATENT DOCUMENTS

| | | | | |
|---|---|---|---|---|
| CN | 205168762 U | | 4/2016 | |
| CN | 205469541 U | | 8/2016 | |
| CN | 205675165 U | | 11/2016 | |
| CN | 205769861 U | | 12/2016 | |
| CN | 106976516 A | * | 7/2017 | |
| CN | 206664786 U | | 11/2017 | |
| CN | 108100135 A | | 6/2018 | |
| CN | 108482553 A | | 9/2018 | |
| CN | 108674553 A | | 10/2018 | |
| CN | 108674555 A | | 10/2018 | |
| CN | 108674556 A | * | 10/2018 | |
| CN | 113734337 A | * | 12/2021 | |
| CN | 114524042 A | * | 5/2022 | ............... B62H 3/00 |
| DE | 102013106634 A1 | * | 10/2014 | ............... B62J 1/08 |
| WO | 2017164913 A1 | | 9/2017 | |

OTHER PUBLICATIONS

Gökalp Yağiz, "You Carry Your Suitcase, Not Your Suitcase", Digitalem, Retrieved from https://www.digitalem.com/6077/siz-bavulunuzu-degil-bavulunuz-sizi-tasisin/, Mar. 7, 2019, 04 pages.

* cited by examiner

COMPACTABLE VEHICLE

CROSS-REFERENCE TO RELATED APPLICATION

This application is a continuation of and claims benefit to U.S. patent application Ser. No. 16/894,456, filed on Jun. 5, 2020 and titled "Compactible Vehicle", the disclosure of which application is incorporated by reference herein in its entirety.

BACKGROUND

Advancements in personal transportation, especially in micro-mobility, have led to adoption and popularity of various types of transport-means, such as motorized scooters, e-bikes, e-skateboards, or e-unicycles. These transport-means may come in wide variety of shapes and sizes and may allow a single person to easily carry, store, and ride in various types of spaces, especially spaces, such as campus areas or airports. For short distance travel (e.g., 2-8 miles), vehicles designed for micro-mobility may offer more user comfort and save costs as wells travel time as compared to traditional cars which may be more suited for long distance travel (e.g., >8-10 miles).

Limitations and disadvantages of conventional and traditional approaches will become apparent to one of skill in the art, through comparison of described systems with some aspects of the present disclosure, as set forth in the remainder of the present application and with reference to the drawings.

SUMMARY

An exemplary aspect of the disclosure provides a vehicle. The vehicle may include a body and a steering assembly coupled to the body. The steering assembly may include a wheel assembly and an elongated structure configured to pivotally rotate along a first axis to collapse within a first storage compartment of the body. The elongated structure may include a first end, a second end coupled to the wheel assembly, and a slot that may extend between the first end and the second end. The steering assembly may further include a handlebar configured to be pivotally disposed in the slot. The vehicle may further include a seating assembly coupled to the body. The seating assembly may include a seat and a support member configured to slidably retract along a second axis within a second storage compartment of the body. The seat may be pivotally coupled to the support member.

Another exemplary aspect of the disclosure provides a vehicle. The vehicle may include a body and a steering assembly coupled to the body. The steering assembly may include a wheel assembly and an elongated structure. The elongated structure may include a first end, a second end coupled to the wheel assembly, and a slot that may extend between the first end and the second end. The steering assembly may further include a handlebar pivotally disposed in the slot. The vehicle may further include a seating assembly coupled to the body. The seating assembly may include a support member retractably coupled to the body and a seat pivotally coupled to the support member.

Another exemplary aspect of the disclosure provides a method for assembly of a vehicle. The method may include assembling a steering assembly. The assembling of the steering assembly may include placing an elongated structure that may include a slot extending between a first end and a second end of the elongated structure. The assembling of the steering assembly may further include pivotally disposing a handlebar in the slot of the placed elongated structure and coupling the second end of the elongated structure to a wheel assembly. The method may further include disposing the assembled steering assembly in a first portion of an opening on a body and assembling a seating assembly. The assembling of the seating assembly may include retractably coupling a support member to the body and pivotally coupling a seat to the support member. The method may further include disposing the assembled seating assembly in a second portion of the opening on the body.

This summary is provided to introduce a selection of concepts in a simplified form that are further disclosed in the detailed description of the present disclosure. This summary is not intended to identify key or essential inventive concepts of the claimed subject matter, nor is it intended for determining the scope of the claimed subject matter.

BRIEF DESCRIPTION OF THE DRAWINGS

FIG. 5 is explained in conjunction with elements from FIGS. 1, 2A, 2B, 2C, 3A, 3B, 3C, 4A, 4B, and 4C.

The foregoing summary, as well as the following detailed description of the present disclosure, is better understood when read in conjunction with the appended drawings. For the purpose of illustrating the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

The following described implementations may be found in the disclosed vehicle. Exemplary aspects of the disclosure may provide a vehicle, which may allow a user to store and carry the vehicle in a compacted configuration, where a steering assembly, a seating assembly, and a wheel assembly of the vehicle may retract inside the body of the vehicle. The user may be allowed to easily transform the vehicle from the compacted configuration to the uncompacted configuration so that the vehicle may be ready to be used for a ride.

The steering assembly of the vehicle may include an elongated structure and a handlebar that may be disposed in a slot of the elongated structure. The handlebar may be configured to pivotally rotate within the slot of the elongated structure to form a compact structure. As the handlebar pivotally rotates within the elongated structure, the elongated structure may be configured to pivotally collapse within a first storage compartment of the vehicle. The first storage compartment may enclose the elongated structure for compactness of the vehicle and to add to aesthetics of the vehicle. The steering assembly may further include a wheel assembly coupled to the elongated structure. The wheel assembly may include wheels, at least one of which may be configured to retract inside the body. Once retracted, the vehicle may attain a much more compact form.

The seating assembly may include a seat that may be coupled with a support member of the seating assembly. The seat may be configured to pivotally rotate against the support member to form a compact structure. As the seat pivotally rotates against the support member, the support member may be configured to retractably slide within a second storage compartment of the body. The second storage compartment may enclose the seating assembly for further compactness of the vehicle and to further add to the aesthetics of the vehicle. As the vehicle offers a compacted configuration, minimal storage area may be required to store the vehicle in the compacted configuration.

The vehicle may include provisions, such as a motorized driving unit and a driving controller, to control a speed/movement of the vehicle. The user may be able to maneuver the driving controller on the handlebar to generate control signals for the motorized driving unit. Based on the control signals, the motorized driving unit may control the wheels of the wheel assembly.

The vehicle may also include provisions for storage of electronic and non-electronic items and wireless charging of the vehicle itself or other vehicles in a charging region of a wireless charger. This may facilitate the vehicle to be stored in compact places where the vehicle or a stack of vehicles can be charged wirelessly. For example, a stack of vehicles in the compacted configuration may easily be placed above the wireless charger in trunk of a car so that all the vehicles can be charged, simultaneously. The vehicle may also include charging points to share electric power when the two or more vehicles mate each other to form a stack.

Reference will now be made in detail to specific aspects or features, examples of which are illustrated in the accompanying drawings. Wherever possible, corresponding or similar reference numbers will be used throughout the drawings to refer to the same or corresponding parts.

Figure 1:
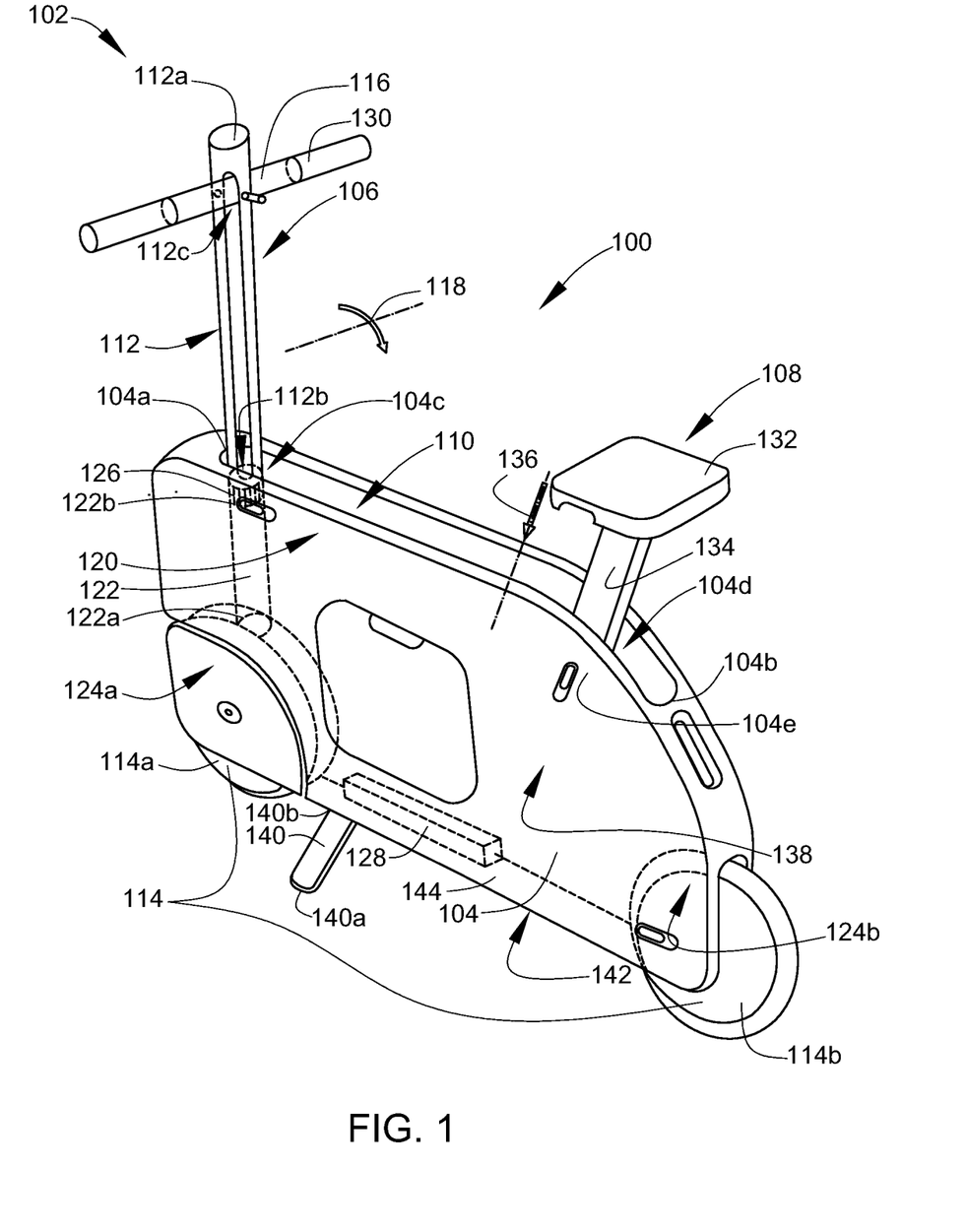
FIG. 1 is a diagram that illustrates a perspective view of an exemplary vehicle in an uncompacted configuration 102, in accordance with an embodiment of the disclosure.

FIG. 1 is a diagram that illustrates a perspective view of an exemplary vehicle in an uncompacted configuration, in accordance with an embodiment of the disclosure. With reference to FIG. 1, there is shown a vehicle 100. The vehicle 100 may have provisions to be a non-autonomous vehicle, a semi-autonomous vehicle, or a fully autonomous vehicle, for example, as defined by National Highway Traffic Safety Administration (NHTSA). The vehicle 100 may use one or more distinct renewable or non-renewable power sources, such as, but not limited to, a solar-powered source, a battery-based electric power source, a fossil fuel-based power source (such as diesel or petrol), a hydrogen fuel-based power source, or a fuel cell-based power source. In FIG. 1, the vehicle 100 is shown in an uncompacted configuration 102. Herein, the uncompacted configuration 102 may correspond to a vehicle 100 setup in which the vehicle 100 may be ready to be used for a ride.

The vehicle 100 may include a body 104, a steering assembly 106 coupled to the body 104, and a seating assembly 108 coupled to the body 104. The body 104 may be made up of a light-weight material, such as plastic or carbon fibre. The body 104 may include an opening 110 which may be configured to accommodate the steering assembly 106 and the seating assembly 108 of the vehicle 100. The opening 110 may extend from a first end 104a of the body 104 to a second end 104b of the body 104. By way of example, and not limitation, the opening 110 may have a substantially rectangular profile that may be filleted on the first end 104a and the second end 104b. Alternatively, the opening 110 may have any other structure profile, such as, but not limited to, a sinusoidal slit profile or a serrated slit profile. The opening 110 may include a first portion 104c and a second portion 104d. The first portion 104c of the opening 110 may be configured to receive the steering assembly 106 and the second portion 104d of the opening 110 may be configured to receive the seating assembly 108. In at least one embodiment, the body 104 of the vehicle 100 may have a substantially filleted cuboidal shape. For example, the body 104 may include a corner 104e that may be fileted to have a fillet radius substantially larger than a filet radius of other corners of the body 104.

The steering assembly 106 may include an elongated structure 112, a wheel assembly 114, and a handlebar 116. The steering assembly 106 may also include other components, such as a suspension system or a brake pad, which are omitted from the disclosure for the sake of brevity. The elongated structure 112 may be configured to pivotally rotate along a first axis 118 to retractably collapse or flush within a first storage compartment 120 of the body 104 of the vehicle 100. The first storage compartment 120 may be a dedicated space in the body 104 to releasably enclose the elongated structure 112. The elongated structure 112 may have a steering adjustment member (not shown) that may be configured to adjust the height of the elongated structure 112. In at least one embodiment, the elongated structure 112 may be a hollow structure which may help to reduce an overall curb weight of the vehicle 100. Alternatively, the elongated structure 112 may be formed as a solid structure which may increase a rigidity of the vehicle 100.

The elongated structure 112 may include a first end 112a and a second end 112b coupled to the wheel assembly 114. The elongated structure 112 may further include a slot 112c that may be disposed between the first end 112a and the second end 112b of the elongated structure 112. In an embodiment, the slot 112c may have a substantially filleted rectangular profile. The slot 112c may also have any other profile, such as, but not limited to, a sinusoidal shaped slot profile, a serrated slot profile, and the like.

The wheel assembly 114 may be retractably coupled to the body 104 of the vehicle 100 and may include a front wheel 114a, a rear wheel 114b, and a first wheel support 122, and a second wheel support (not shown). Although, in FIG. 1, the wheel assembly 114 includes two wheels, i.e. the front wheel 114a and the rear wheel 114b; however, the disclosure may not be so limiting and in some embodiments, the wheel assembly 114 may include more than two wheels or less than two wheels. The front wheel 114a may be statically disposed in a first wheel mounting portion 124a of the body 104 and may be mounted on the first wheel support 122, coupled to the second end 112b of the elongated structure 112. Similarly, the rear wheel 114b may be retractably disposed in a second wheel mounting portion 124b of the body 104.

The front wheel 114a may be supported by the first wheel support 122 and the rear wheel 114b may be supported by the second wheel support (not shown). The first wheel support 122 may be coupled with the second end 112b of the elongated structure 112 through a coupling member 126, such that, a directional movement of the elongated structure 112 may impact a directional movement of the front wheel 114a. By way of example, and not limitation, the first wheel support 122 may have a substantially cylindrical shape to hold the front wheel 114a. The first wheel support 122 may include a first end 122a coupled to the front wheel 114a and a second end 122b coupled with the coupling member 126. The coupling member 126 may have a suitable structural and functional design element that may be configured to engage the elongated structure 112 with the front wheel 114a. Examples of the coupling member 126 may include, but is not limited to, a gear tooth coupling member, a pin bush coupling member, or a rigid coupling member. Although the disclosure describes the coupling member 126 as a unitary member; however, in some embodiments, more than one coupling member may be disposed between the elongated structure 112 and the first wheel support 122.

The steering assembly 106 may further include the handlebar 116 that may be configured to steer the vehicle 100. The handlebar 116 may be configured to be pivotally disposed in the slot 112c of the elongated structure 112. In the uncompacted configuration 102 of the vehicle 100, the handlebar 116 may be configured to be releasably locked to the slot 112c and arranged substantially perpendicular to the elongated structure 112. The handlebar 116 may have a substantially cylindrical structure or may have any other structure, such as, but not limited to, a substantially square structure or a substantially hexagonal structure. Alternatively, in some embodiments, a steering wheel (not shown) may be used instead of the handlebar 116 to the steer the vehicle 100.

In at least one embodiment, the vehicle 100 may further include a motorized driving unit 128 and a driving controller 130. The motorized driving unit 128 may be coupled to the wheel assembly 114. For example, a shaft (not shown) of the motorized driving unit 128 may be coupled to at least one of the front wheel 114a or the rear wheel 114b of the wheel assembly 114. The motorized driving unit 128 may include, for example, an electric motor (not shown), a driver circuit (not shown), a power management system (not shown), and other components, details of which are omitted from disclosure for the sake of brevity. Herein, the driver circuit may be configured to control the electric motor to drive at least the front wheel 114a or the rear wheel 114b of the wheel assembly 114.

The driving controller 130 may include a suitable logic, circuitry, and interfaces that may be configured to generate control signals for the motorized driving unit 128. In the uncompacted configuration 102 of the vehicle 100, the motorized driving unit 128 may be configured to receive the control signals and drive the wheel assembly 114 based on the received control signals. The driving controller 130 may be coupled to the handlebar 116 so that a user may maneuver the driving controller 130 to control a driving speed of the vehicle 100. Alternatively, the driving controller 130 may be disposed on the steering assembly 106 at any suitable location, from where it may be convenient for the user to maneuver and control a driving speed or an acceleration of the vehicle 100. The user may control the direction of movement of the vehicle 100 by maneuvering the handlebar 116 of the steering assembly 106 and/or by triggering the driving controller 130. While maneuvering the steering assembly 106 and/or triggering the driving controller 130, the user may be able to comfortably sit on the seating assembly 108.

In some embodiments, the driving controller 130 may include control units (not shown) to provide control signals that may be necessary to maneuver and control the driving speed or the acceleration of the vehicle 100. Examples of such control units may include, but are not limited to, an accelerator, a braking system, or a clutch. Alternatively, in absence of the driving controller 130, the motorized driving unit 128 may act as a self-driving unit which may be configured to generate control signals for itself based on pre-programmed triggers/conditions associated with the user or the vehicle 100. As an example, as the user sits on the vehicle 100, a condition related to a user occupancy of the vehicle 100 may be detected. Upon detection, the motorized driving unit 128 may generate control signals to drive the electric motor of the motorized driving unit 128.

In an embodiment, the motorized driving unit 128 may be configured to drive the rear wheel 114b based on control signals received via the driving controller 130. In such a case, the front wheel 114a may be disposed as an idler-wheel and may receive directional inputs via the handlebar 116. The front wheel 114a may be driven based on rotation of the rear wheel 114b. Alternatively, in another embodiment, the motorized driving unit 128 may be configured to drive the front wheel 114a based on control signals received via the driving controller 130. In this case, the rear wheel 114b may be disposed as an idler-wheel and may be driven based on rotation of the front wheel 114a. Alternatively, in another embodiment, the motorized driving unit 128 may be configured to drive both the front wheel 114a and the rear wheel 114b based on control signals received via the driving controller 130. A user (not shown) may control a speed and a direction of movement of the vehicle 100 by maneuvering the driving controller 130 and the handlebar 116 of the steering assembly 106. While maneuvering the steering assembly 106, the user may be able to comfortably sit on the seating assembly 108.

The seating assembly 108 may include a seat 132 and a support member 134. The seat 132 may be pivotally coupled to the support member 134. In the uncompacted configuration 102 of the vehicle 100, the seat 132 may be configured to be releasably locked to the support member 134 and arranged substantially perpendicular to the support member 134. By way of example, and not limitation, the seat 132 may have a substantially filleted cuboidal shape and may be configured to pivotally rotate against the support member 134. The seat 132 shown in FIG. 1 is merely provided as an example and should not be construed as limiting for the disclosure. The present disclosure may be also applicable to other seat shapes or seat designs, without a deviation from the scope of the disclosure.

The support member 134 may be configured to provide a support to the seat 132. For a compacted configuration, the support member 134 may be configured to slidably retract along a second axis 136 to retractably flush or collapse within a second storage compartment 138 of the body 104. Herein, the second storage compartment 138 may be a second space in the body 104 to releasably enclose the support member 134.

In at least one embodiment, the support member 134 may include a seating adjustment member (not shown), which when maneuvered, may be configured to adjust height of the support member 134. By way of example, and not limitation, the support member 134 may have a substantially rectangular shape. The support member 124 shown in FIG. 1 is merely provided as an example and should not be construed as limiting for the disclosure. The present disclosure may be also applicable to other shapes of the support member, without a deviation from the scope of the disclosure.

In at least one embodiment, the vehicle 100 may further include a first peg 140 located at a bottom portion 142 of the body 104 that may be configured to retractably protrude from a first side 144 of the body 104. Similarly, the vehicle 100 may also include a second peg (not shown) located the bottom portion 142 of the body 104 that may be configured to retractably protrude from a second side (not shown) of the body 104. By way of example, and not limitation, the first peg 140 may have a substantially rectangular shape and may include a first end 140a and a second end 140b. While the second end 140b of the first peg 140 may be pivotably coupled to the bottom portion 142 of the body 104, the first end 140a may be configured to retractably protrude from the first side 144 of the body 104. In at least one embodiment, the first peg 140 and the second peg may be additionally provided with a grip member (not shown) to allow to the user to have a better grip on the first peg 140 and the second peg.

Figure 2A:
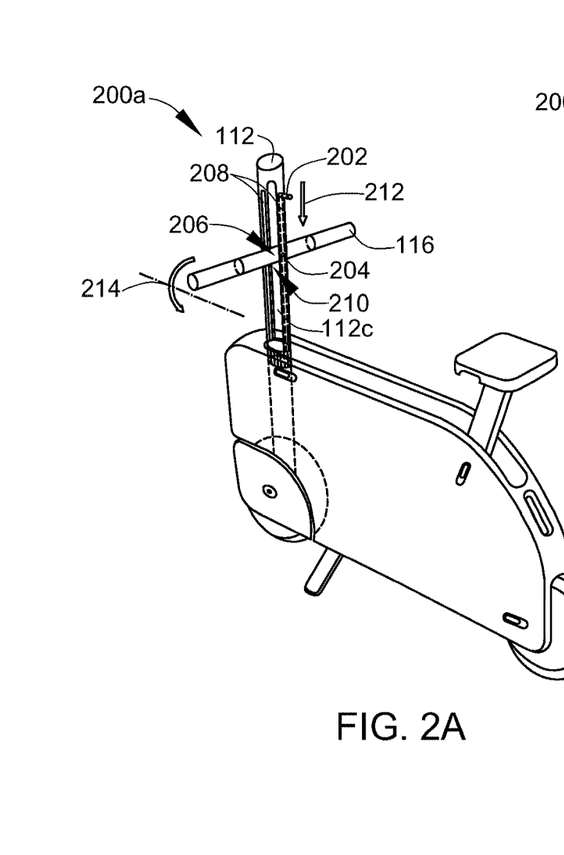
FIGS. 2A, 2B, and 2C are diagrams that collectively illustrate a transition of a steering assembly of the exemplary vehicle of FIG. 1 from an uncompacted configuration to a compacted configuration, in accordance with an embodiment of the disclosure.
Figure 2B:
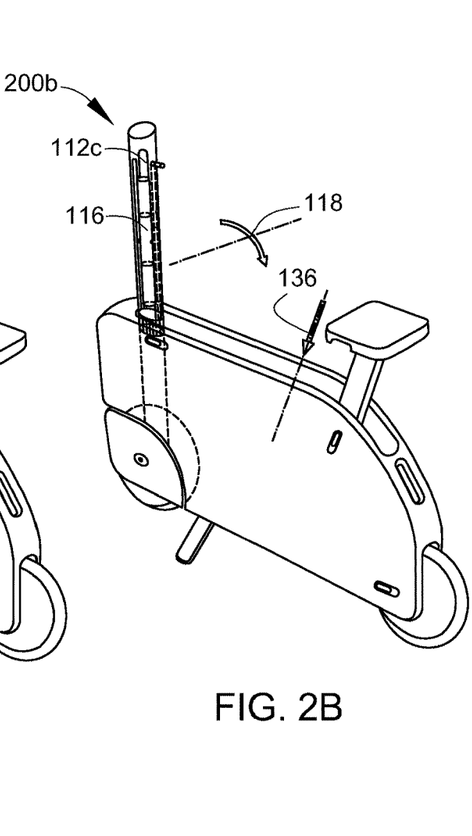
Figure 2C:
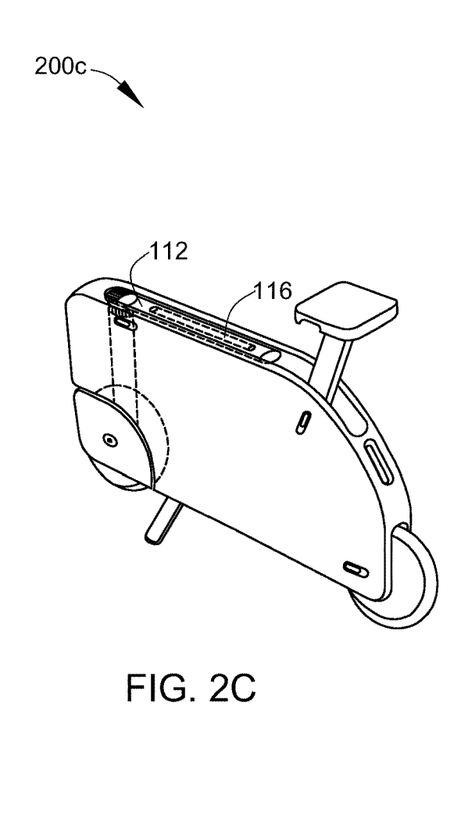

FIGS. 2A, 2B, and 2C are diagrams that collectively illustrate a transition of a steering assembly of the exemplary vehicle of FIG. 1 from an uncompacted configuration to a compacted configuration, in accordance with an embodiment of the disclosure. FIGS. 2A, 2B, and 2C are explained in conjunction with elements from FIG. 1. With reference to FIGS. 2A, 2B, and 2C, there is shown an uncompacted configuration 200a, an intermediate configuration 200b, and a compacted configuration 200c of the steering assembly 106 of the vehicle 100.

In the uncompacted configuration 200a, the handlebar 116 may be configured to be releasably locked to the slot 112c and arranged substantially perpendicular to the elongated structure 112. By way of example, and not limitation, the vehicle 100 may include a handle lock 202 that may be configured to lock the handlebar 116 to the slot 112c of the elongated structure 112. The handle lock 202 may have, for example, a substantially cylindrical structure and may be disposed adjacent to the first end 112a of the elongated structure 112. The handlebar 116 may include a pivoting member 204 that may externally protrude from a mid-point 206 of the handlebar 116. The pivoting member 204 may be configured to pivotally couple the handlebar 116 to the slot 112c of the elongated structure 112 so that the handlebar 116 can be arranged substantially perpendicular to the elongated structure 112. By way of example, and not limitation, the pivoting member 204 may have a substantially cylindrical structure or any suitable structure to match with an arrangement of a guide rail 208 within the elongated structure 112.

By way of example, and not limitation, the guide rail 208 may have a linearly toothed profile that may be configured to couple and hold the pivoting member 204. The toothed profile of the guide rail 208 may include a plurality of convex and concave tooth profiles (not shown). The substantially cylindrical surface of the pivoting member 204 may mate with one of the plurality of concave tooth profiles of the guide rail 208 to releasably lock the handlebar 116 to the slot 112c of the elongated structure 112. Alternatively, the pivoting member 204 may have a plurality of convex and concave tooth profiles (not shown) that may mate with one of the plurality of concave and convex tooth profiles of the guide rail 208 to releasably lock the handlebar 116 to the slot 112c of the elongated structure 112.

In the intermediate configuration 200b, the handlebar 116 may be configured to be unlocked from the slot 112c and slidably moved to a mid-portion 210 of the elongated structure 112. Herein, the pivoting member 204 may allow the handlebar 116 to slide along a first direction 212 to the mid-portion 210 of the elongated structure 112. For example, when the handle lock 202 is released from the uncompacted configuration 200a, the pivoting member 204 may be configured to slide within the slot 112c to the mid-portion 210, through the guide rail 208 disposed within the slot 112c of the elongated structure 112.

At the mid-portion 210, the handlebar 116 may be pivotally rotated along a third axis 214 to releasably fit and/or flush the handlebar 116 within the slot 112c of the elongated structure 112. The handlebar 116 may be rotated along the third axis 214 which may be substantially perpendicular to the first axis 118. For example, the pivoting member 204 may allow the handlebar 116 to pivotally rotate along the third axis 214, at the mid-portion 210, to releasably fit within the slot 112c.

In the compacted configuration 200c, the elongated structure 112 may be configured to pivotally rotate along the first axis 118 to collapse and/or flush within the first storage compartment 120 after the handlebar 116 rotates to releasably fit within the slot 112c. Although, FIGS. 2A, 2B, and 2C describe the transition of the steering assembly 106 from the uncompacted configuration 200a to the compacted configuration 200c; however, the disclosure may be also applicable to the transition of the steering assembly 106 from the compacted configuration 200c to the uncompacted configuration 200a.

Figure 3A:
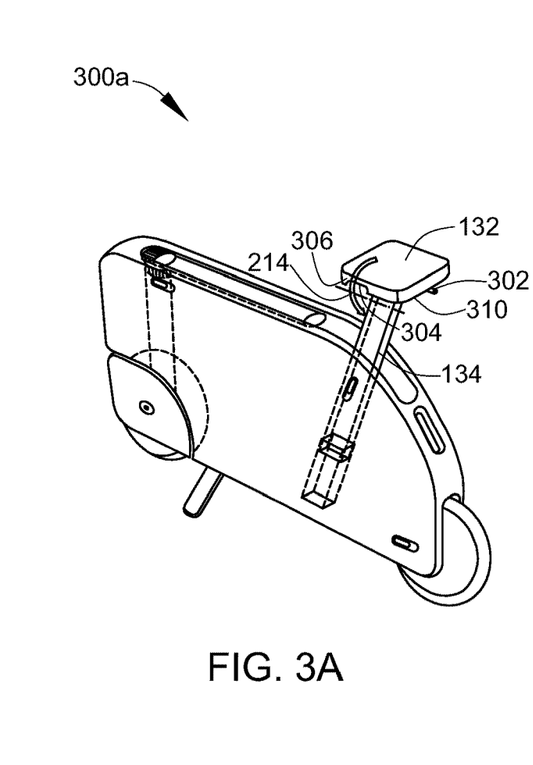
FIGS. 3A, 3B, and 3C are diagrams that collectively illustrate a transition of a seating assembly of the exemplary compact vehicle of FIG. 1 from an uncompacted configuration to a compacted configuration, in accordance with an embodiment of the disclosure.
Figure 3B:
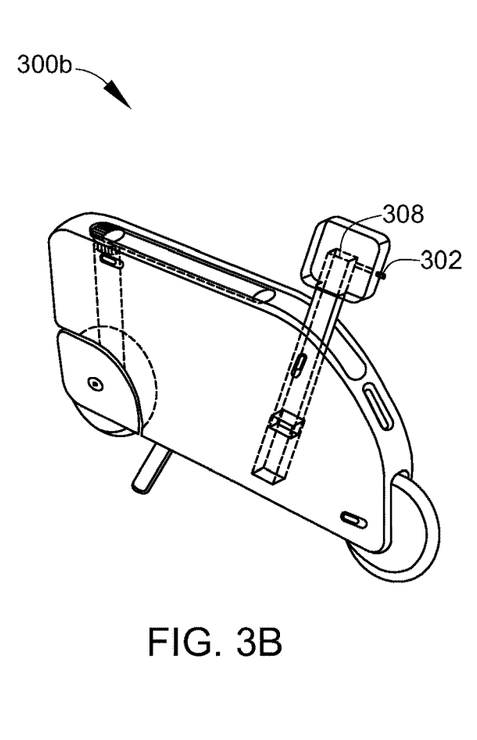
Figure 3C:
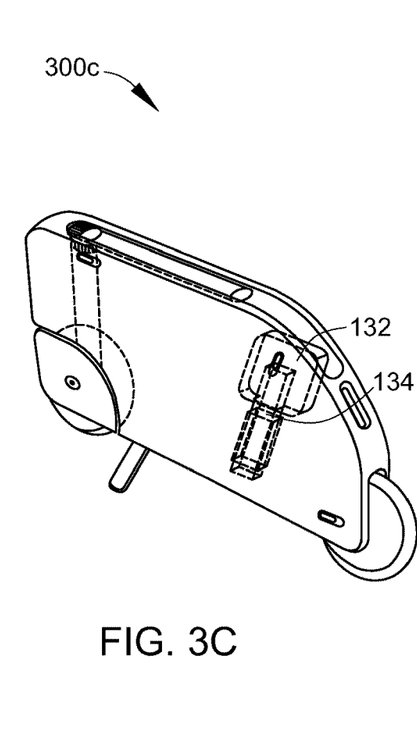

FIGS. 3A, 3B, and 3C are diagrams that collectively illustrate a transition of a seating assembly of the exemplary compact vehicle of FIG. 1 from an uncompacted configuration to a compacted configuration, in accordance with an embodiment of the disclosure. FIGS. 3A, 3B, and 3C are explained in conjunction with elements from FIGS. 1, 2A, 2B, and 2C. With reference to FIGS. 3A, 3B, and 3C, there is shown an uncompacted configuration 300a, an intermediate configuration 300b, and a compacted configuration 300c of the seating assembly 108 of the vehicle 100.

In the uncompacted configuration 300a, the seat 132 may be configured to be releasably locked to the support member 134 and arranged substantially perpendicular to the support member 134. For example, a seat lock 302 may include a suitable mechanical implement and/or circuitry that may be configured to releasably lock the seat 132 with the support member 134 at a fixed position or at any other angular position in accordance with user requirements.

In the intermediate configuration 300b, the seat 132 may be configured to pivotally rotate along the third axis 214. Such a rotation of the seat 132 may cause the seat 132 to fold sideways along the third axis 214 and releasably engage with the support member 134 of the seating assembly 108, through a cut-out 304 formed at a first end 306 of the seat 132. Herein, the third axis 214 may be substantially perpendicular to the first axis 118 along which the elongated structure 112 rotates to collapse in the first storage compartment 120 of the body 104.

By way of example, and not limitation, the seating assembly 108 may include a hinge 308 configured to externally protrude from a base 310 of the seat 132 and configured to pivotably couple the seat 132 to the support member 134. Examples of the hinge 308 may include, but are not limited to, a butt hinge, a flush hinge, a ball-bearing hinge, or a strap hinge. The hinge 308 may be configured to allow the seat 132 to rotate along the third axis 214, causing the seat 132 to fold sideways to engage with the support member 134. While the seat 132 rotates about the hinge 308 and towards the support member 134, the cut-out 304 of the seat 132 may mate with the support member 134 to form a compact seat arrangement (as illustrated in FIG. 3B).

In the compacted configuration 300c, the support member 134 may be configured to slidably retract along the second axis 136 and within the second storage compartment 138 of the body 104. Herein, while the support member 134 retracts, the seat 132 may be folded sideways such that the seat 132 engages with the support member 134, through the cut-out 304 formed at the first end 306 in the seat 132. By way of example, and not limitation, as the cut-out 304 of the seat 132 mates with the support member 134, the seat lock 302 may be configured to releasably lock the seat 132. Once the seat lock 302 locks the hinge 308 at the fixed position, the seating assembly 108 may retractably slide along the second axis 136 to flush within the second storage compartment 138 of the body 104. Although, FIGS. 3A, 3B, and 3C describe the transition of the seating assembly 108 from the uncompacted configuration 300a to the compacted configuration 300c; however, the disclosure may be also applicable to the transition of the steering assembly 106 from the compacted configuration 300c to the uncompacted configuration 300a.

Figure 4A:
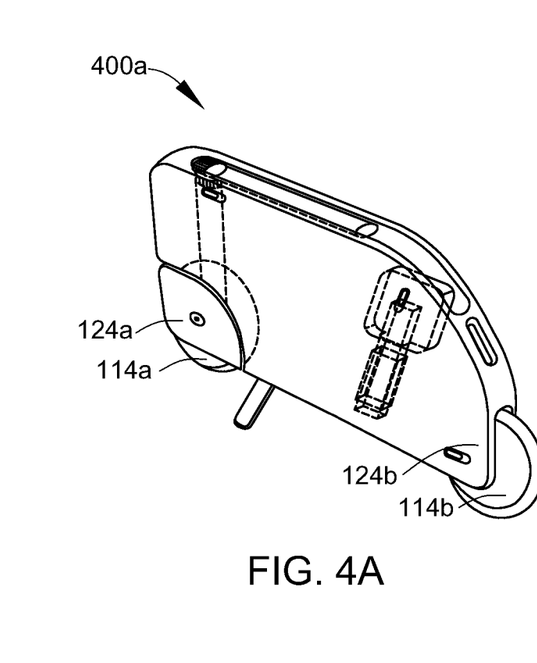
FIGS. 4A, 4B, and 4C are diagrams that collectively illustrate a transition of a wheel assembly and pegs of the exemplary vehicle of FIG. 1 from an uncompacted configuration to a compacted configuration, in accordance with an embodiment of the disclosure.
Figure 4B:
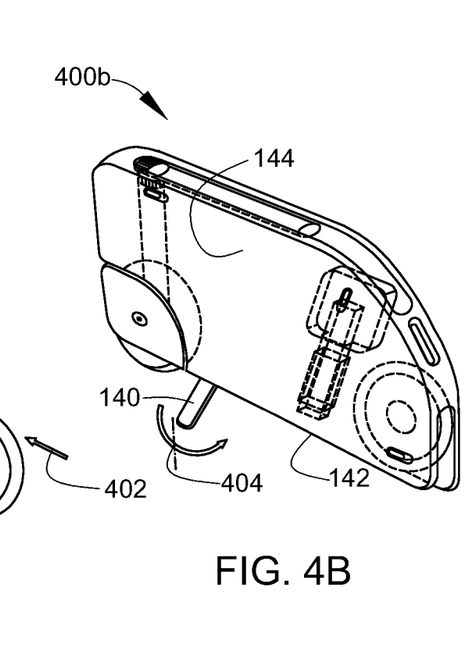
Figure 4C:
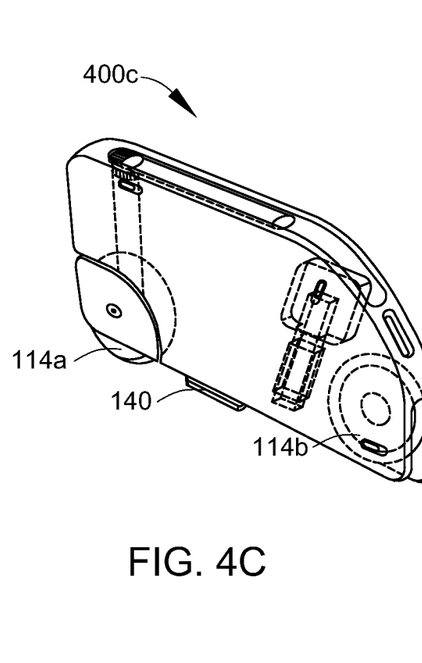

FIGS. 4A, 4B, and 4C are diagrams that collectively illustrate a transition of a wheel assembly and pegs of the exemplary vehicle of FIG. 1 from an uncompacted configuration to a compacted configuration, in accordance with an embodiment of the disclosure. FIGS. 4A, 4B, and 4C are explained in conjunction with elements from FIGS. 1, 2A, 2B, 2C, 3A, 3B, and 3C. With reference to FIGS. 4A, 4B, and 4C, there is shown an uncompacted configuration 400a, an intermediate configuration 400b, and a compacted configuration 400c of the wheel assembly 114 and/or pegs (i.e. the first peg 140 and the second peg (not shown)) of the vehicle 100.

In the uncompacted configuration 400a, the front wheel 114a of the wheel assembly 114 may be statically disposed in the first wheel mounting portion 124a of the body 104. The rear wheel 114b may be retractably disposed in the second wheel mounting portion 124b of the body 104. Additionally, or alternatively, in the uncompacted configuration 400a, the first peg 140 may be configured to protrude from the first side 144 of the body 104 and the second peg may be configured to protrude from a second side (not shown) of the body 104.

In the intermediate configuration 400b, the rear wheel 114b may be configured to retract inside the body 104 along a second direction 402, and stay disposed within the second wheel mounting portion 124b. Additionally, in at least one embodiment, the front wheel 114a may be configured to retract inside the body 104 and stay disposed within the first wheel mounting portion 124a.

In the intermediate configuration 400b, the first peg 140 may pivotally rotated along a fourth axis 404 and towards the first side 144 of the body 104, so that, the first peg 140 may get flushed below the bottom portion 142 of the body 104. The second peg (not shown) may also be pivotally rotated along the fourth axis 404 and towards the second side of the body 104, so that, the second peg may get flushed below the bottom portion 142 of the body 104.

In the compacted configuration 400c, the rear wheel 114b may be in a retracted state inside the body 104 and within the second wheel mounting portion 124b. Additionally, in at least one embodiment, the front wheel 114a may also be in a retracted state inside the body 104 and within the first wheel mounting portion 124a. The bottom portion 142 of the body 104 may hide the first peg 140 and the second peg. Although, FIGS. 4A, 4B, and 4C describe the transition of the wheel assembly 114 and pegs from the uncompacted configuration 400a to the compacted configuration 400c; however, the disclosure may be also applicable to the transition of the wheel assembly 114 and the pegs from the compacted configuration 400c to the uncompacted configuration 400a.

Figure 5:
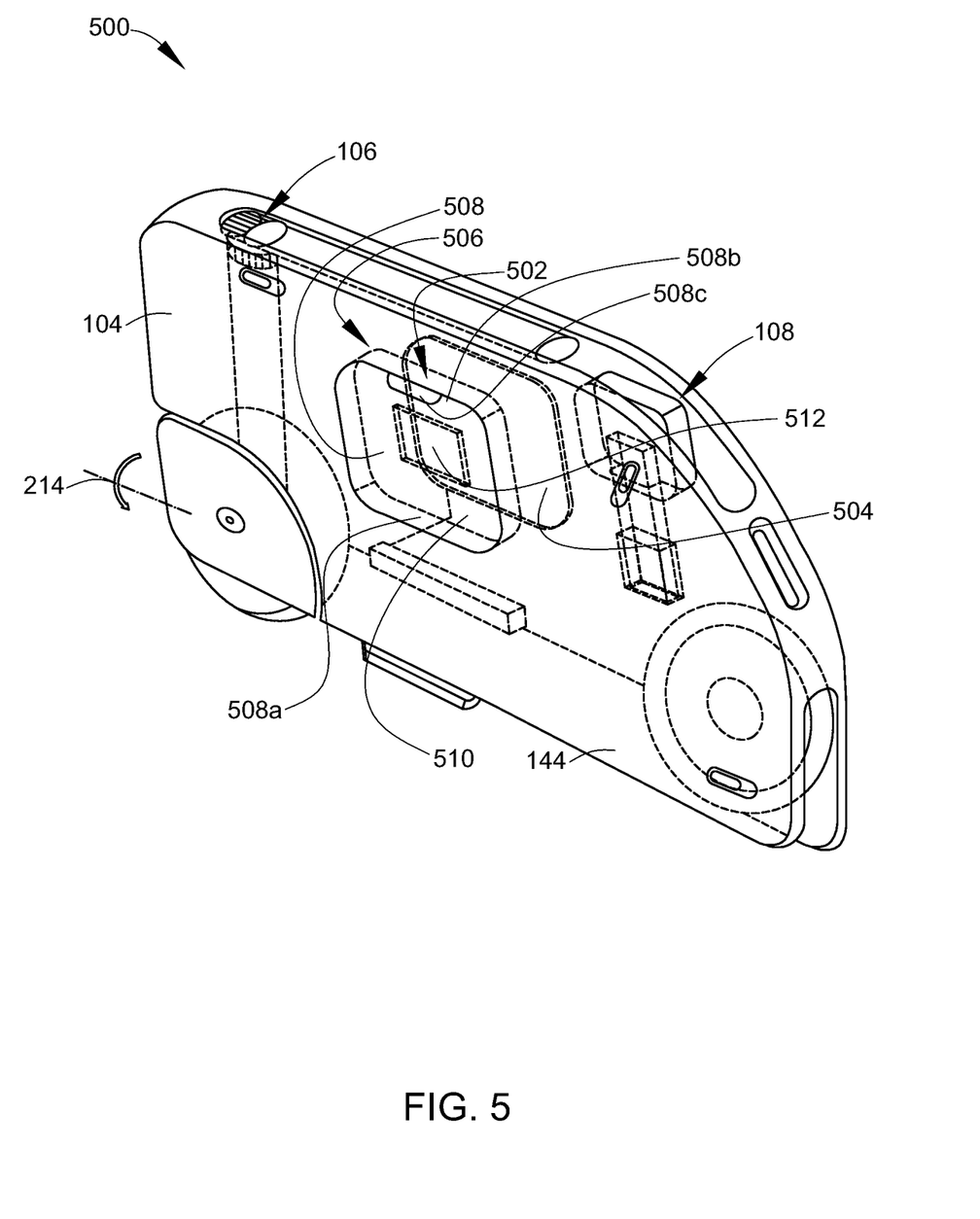
FIG. 5 is a diagram that illustrates a compacted configuration of the exemplary vehicle of FIG. 1, in accordance with an embodiment of the disclosure.

FIG. 5 is a diagram that illustrates a compacted configuration of the exemplary vehicle of FIG. 1, in accordance with an embodiment of the disclosure. FIG. 5 is explained in conjunction with elements from FIGS. 1, 2A, 2B, 2C, 3A, 3B, 3C, 4A, 4B, and 4C. With reference to FIG. 5, there is shown a compacted configuration 500 of the vehicle 100. The vehicle 100 may include a storage unit 502 and a charging device 504. The storage unit 502 may be disposed in a storage space 506 of the body 104. The storage space 506 may be located between the steering assembly 106 and the seating assembly 108, for example. By way of example, and not limitation, the storage unit 502 may have a substantially filleted cuboidal structure or other suitable structures for storing items, such as, but not limited to, a plurality of chargeable electronic devices, a plurality of non-chargeable electronic devices, non-electronic items, or a combination thereof.

The storage unit 502 may include an access door 508 that may seamlessly fit into a cut-out portion 510 of the first side 144 of the body 104. The access door 508 may have a first end 508a and a second end 508b. The first end 508a of the access door 508 may include an access hinge (not shown) that may be pivotably coupled to a first end (not shown) of the cut-out portion 510 of the body 104. In order to open the storage unit 502, the access door 508 may be configured to pivot about the access hinge along the third axis 214. The second end 508b of the access door 508 may have a handle portion 508c to facilitate easy access to the access door 508. The handle portion 508c of the access door 508 may include, for example, a substantially filleted concave portion that may allow a user to access the storage space 506 of the storage unit 502.

In at least one embodiment, the access door 508 may also have a provision for a security system (not shown) that may be deployed to releasably lock the access door 508 of the storage unit 502. Examples of the security system for the storage unit 502 may include, but are not limited to, a physical lock and key system, a virtual cryptographic key based security system, or a touch input-based lock system.

The charging device 504 may be disposed inside the body 104 and located adjacent to the storage unit 502. Alternatively, the charging device 504 may be disposed between the storage unit 502 and the second side of the body 104. The charging device 504 may be configured to wirelessly charge a plurality of chargeable electronic devices 512. The plurality of chargeable electronic devices 512 may be present within the storage unit 502 of the vehicle 100. Alternatively, the plurality of chargeable electronic devices 512 may be present outside the storage unit 502 but within a chargeable region of the charging device 504.

The charging device 504 may include a suitable logic, circuitry, and interfaces that may be configured to form a chargeable region, i.e., a power transmission boundary defined for the charging device 504. The extent of the power transmission boundary may depend on parameters, such as, but not limited to, a size of the charging device 504, an output power of the charging device 504, or a size/turns of an electromagnetic coil of the charging device 504. The charging device 504 may be configured to wirelessly charge the plurality of chargeable electronic devices 512 which may be present within the chargeable region of the charging device 504.

The charging device 504 may support at least one mode of wireless power transmission to wirelessly charge the plurality of chargeable electronic devices 512. Examples of such modes may include, but are not limited to, an induction-based wireless power transmission, a radio-based wireless power transmission, ora resonance-based wireless power transmission.

Figure 6:
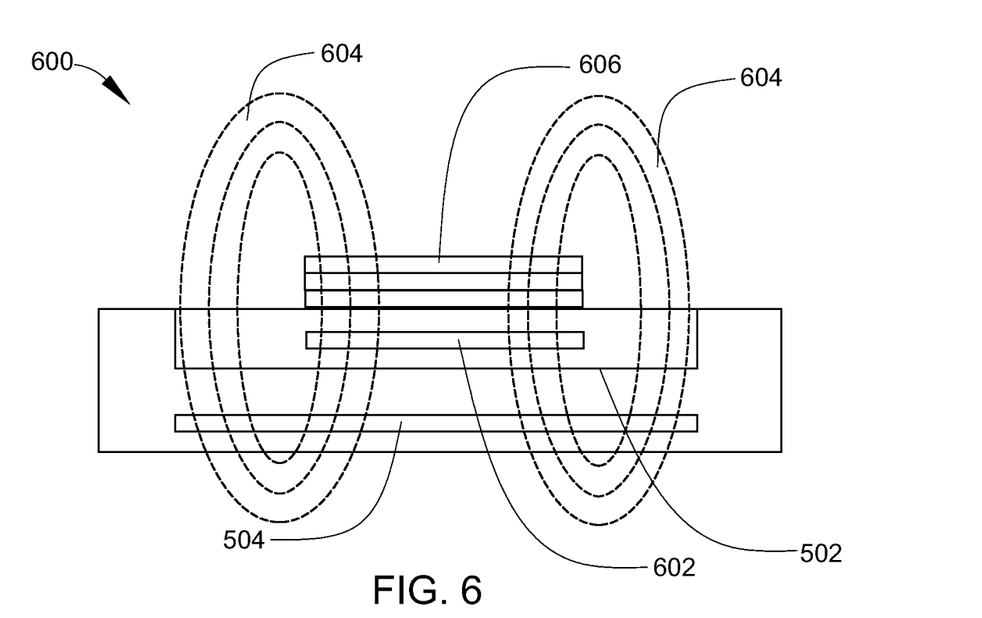
FIG. 6 is a diagram that illustrates an exemplary scenario for wireless charging of items stored in the exemplary vehicle of FIG. 1 or FIG. 5, in accordance with an embodiment of the disclosure.

FIG. 6 is a diagram that illustrates an exemplary scenario for wireless charging of items stored in the exemplary vehicle of FIG. 1 or FIG. 5, in accordance with an embodiment of the disclosure. FIG. 6 is explained in conjunction with elements from FIGS. 1, 2A, 2B, 2C, 3A, 3B, 3C, 4A, 4B, 4C, and 5. With reference to FIG. 6, there is shown an exemplary scenario 600. In the exemplary scenario 600, there is shown the compacted configuration 500 of the vehicle 100. At any time-instant, the user may place the vehicle 100 in a storage area, such as the trunk of a car. While in the storage area, the vehicle 100 may be placed in a resting state so that one of the first side 144 or the second side (not shown) of the vehicle 100 may contact a floor of the trunk.

The storage unit 502 may be configured to store a plurality of chargeable electronic devices 602. The charging device 504 may be configured to wirelessly charge the plurality of chargeable electronic devices 602 that may be present within a chargeable region 604 of the charging device 504. In cases where the chargeable region 604 extends beyond the body 104 of the vehicle 100, the charging device 504 may be configured to charge electronic devices 606 externally disposed on the body 104 or other locations within the chargeable region 604. In at least one embodiment, the electronic devices 606 may be stacked together and placed on the body 104 of the vehicle 100 so as to be charged altogether by the charging device 504.

Figure 7:
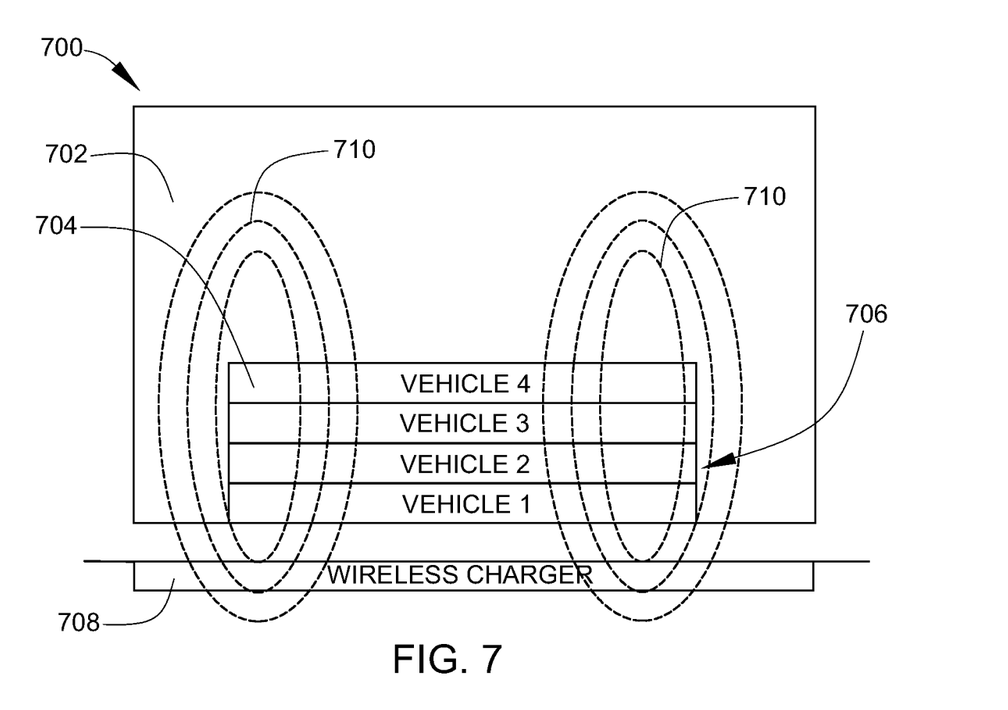
FIG. 7 is a diagram that illustrates an exemplary scenario for wireless charging of a stack of exemplary vehicles of FIG. 1 or FIG. 5, in accordance with an embodiment of the disclosure.

FIG. 7 is a diagram that illustrates an exemplary scenario for wireless charging of a stack of exemplary vehicles of FIG. 1 or FIG. 5, in accordance with an embodiment of the disclosure. FIG. 6 is explained in conjunction with elements from FIGS. 1, 2A, 2B, 2C, 3A, 3B, 3C, 4A, 4B, 4C, and 6. With reference to FIG. 7, there is shown an exemplary scenario 700. In the exemplary scenario 700, there is shown a storage area 702 where a plurality of vehicles 704 may be stacked together to form a stacked arrangement 706. Herein, each vehicle of the plurality of vehicles may be same as the vehicle 100 of FIG. 1 or FIG. 5.

The storage area 702 may include a wireless charger 708, onto which, the stacked arrangement 706 of the plurality of vehicles 704 may be placed. As the stacked arrangement 706 of the plurality of vehicles 704 may be placed within a charging region 710 of the wireless charger 708, the wireless charger 708 may be configured to wirelessly charge the stacked arrangement 706 of the plurality of vehicles 704. By way of example, and not limitation, the storage area 702 may be the trunk of a car (not shown) that may accommodate the wireless charger 708 on the floor of the trunk. In such a case, the stacked arrangement 706 of the plurality of vehicles 704 may be placed directly above the wireless charger 708 in the charging region 710. The present disclosure may be applicable to other types of storage area, such as, but not limited to, a parking lot, a subway, or a garage.

Figure 8A:
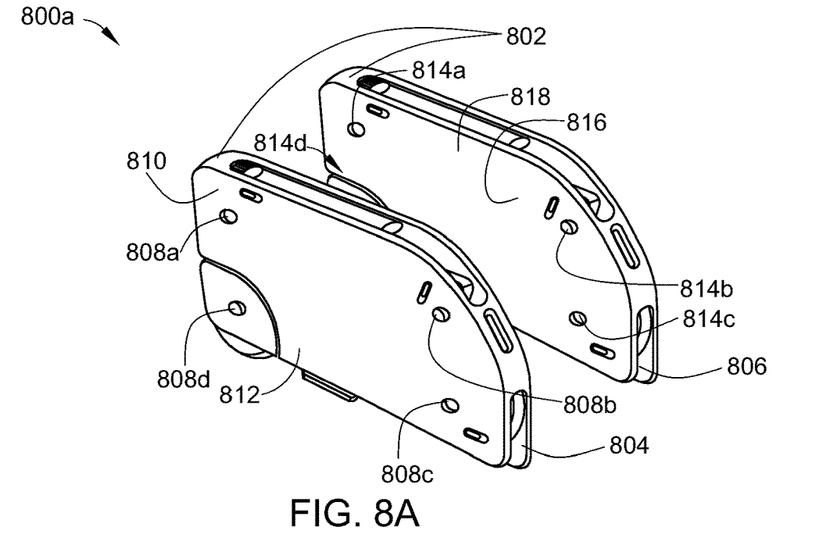
FIG. 8A is a diagram that illustrates an exemplary front view of a pair of vehicles configured to be a stacked together to form a stacked arrangement, in accordance with an embodiment of the disclosure.

FIG. 8A is a diagram that illustrates an exemplary front view of a pair of vehicles configured to be a stacked together to form a stacked arrangement, in accordance with an embodiment of the disclosure. FIG. 8A is explained in conjunction with elements from FIGS. 1, 2A, 2B, 2C, 3A, 3B, 3C, 4A, 4B, 4C, 6, and 7. With reference to FIG. 8A, there is shown an exemplary front view 800a of a pair of vehicles 802 configured to be a stacked together to form a stacked arrangement (as shown in FIG. 8C). Each vehicle of the pair of vehicles 802 may be same as the vehicle 100 of FIG. 1 or FIG. 5. The pair of vehicles 802 may include a first vehicle 804 and a second vehicle 806.

In the exemplary front view 800a, the first vehicle 804 may include a plurality of coupling members 808a, 808b, 808c, and 808d disposed on a first side 810 of a body 812 of the first vehicle 804. For example, the plurality of coupling members 808a, 808b, 808c, and 808d may include four coupling members, which may be shaped as semicircular grooves and placed near four corners on the first side 810 of the body 812. Two of the four coupling members may have a concave profile, while remaining two of the four coupling members may have a convex profile.

In the exemplary front view 800a, the second vehicle 806 may include a plurality of coupling members 814a, 814b, 814c, and 814d disposed on a first side 816 of a body 818 of the second vehicle 806. For example, the plurality of coupling members 814a, 814b, 814c, and 814d may also include four coupling members, which may be shaped as semicircular grooves and placed near four corners on the first side 816 of the body 818. Two of the four coupling members may have a concave profile, while remaining two of the four coupling members may have a convex profile.

The plurality of coupling members 808a, 808b, 808c, and 808d may include a first coupling member 808a, a second coupling member 808b, a third coupling member 808c, and a fourth coupling member 808d. Similarly, the plurality of coupling members 814a, 814b, 814c, and 814d may include a first coupling member 814a, a second coupling member 814b, a third coupling member 814c, and a fourth coupling member 814d.

In one embodiment, on the first side 810 of the body 812 of the first vehicle 804, the first coupling member 808a and the third coupling member 808c (diagonally opposite members) may be male connectors, with a convex profile. Similarly, the second coupling member 808b and the fourth coupling member 808d (diagonally opposite members) on the first side 810 of the body 812 may be female connectors, with a concave profile.

In another embodiment, on the first side 816 of the body 818 of the second vehicle 806, the first coupling member 814a and the third coupling member 814c (diagonally opposite members) may be male connectors, with a convex profile. Similarly, the second coupling member 814b and the fourth coupling member 814d (diagonally opposite members) on the first side 816 of the body 818 may be female connectors, with a concave profile.

In at least one embodiment, each coupling member of the plurality of coupling members 808a, 808b, 808c, and 808d may act as a charging point for a battery of the first vehicle 804. Similarly, each coupling member of the plurality of coupling members 814a, 814b, 814c, and 814d may act as a charging point for a battery of the second vehicle 806. For example, each coupling member of the plurality of coupling members 808a, 808b, 808c, and 808d and the plurality of coupling members 814a, 814b, 814c, and 814d may include a suitably circuitry, such as a Universal Serial Bus (USB)-based charging port. Using the charging point, the first vehicle 804 may be able to share charge/battery power with other vehicles, such as the second vehicle 806, in the stacked arrangement. An exemplary implementation of power sharing between the first vehicle 804 and the second vehicle 806 is described in FIG. 8C.

Figure 8B:
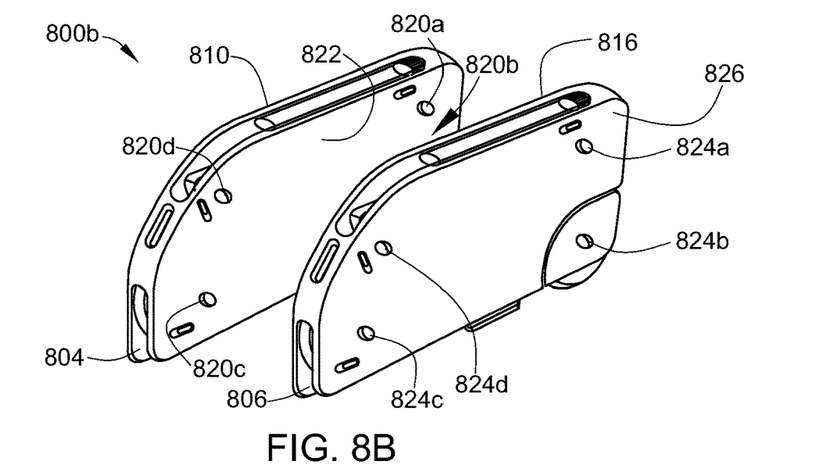
FIG. 8B is a diagram that illustrates an exemplary rear view of the pair of vehicles of FIG. 8A, in accordance with an embodiment of the disclosure.
Figure 8C:
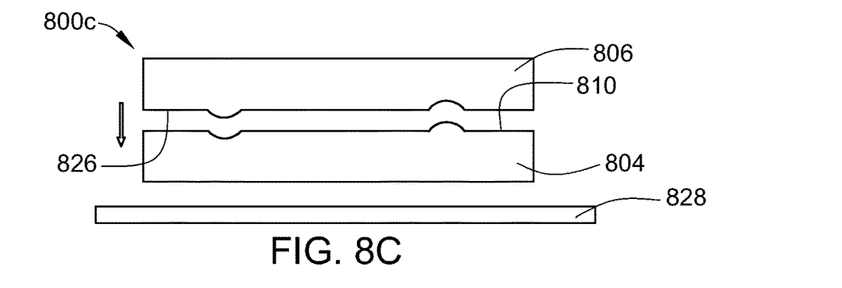
FIG. 8C is a diagram that illustrates a stacked arrangement of the pair of vehicles of FIG. 8A, in accordance with an embodiment of the disclosure.

FIG. 8B is a diagram that illustrates an exemplary rear view of the pair of vehicles of FIG. 8A, in accordance with an embodiment of the disclosure. FIG. 8A is explained in conjunction with elements from FIGS. 1, 2A, 2B, 2C, 3A, 3B, 3C, 4A, 4B, 4C, 6, 7, and 8A. With reference to FIG. 8B, there is shown an exemplary rear view 800b of the pair of vehicles 802.

In the exemplary rear view 800b, the first vehicle 804 may include a plurality of coupling members 820a, 820b, 820c, and 820d disposed on a second side 822 of the body 812. For example, the plurality of coupling members 820a, 820b, 820c, and 820d may include four coupling members, which may be shaped as semicircular grooves and placed near four corners on the second side of the body. Two of the four coupling members may have a concave profile, while remaining two of the four coupling members may have a convex profile.

In the exemplary rear view 800b, the second vehicle 806 may include a plurality of coupling members 824a, 824b, 824c, 824d disposed on a second side 826 of the body 818 of the second vehicle 806. For example, the plurality of coupling members 820a, 820b, 820c, and 820d may include four coupling members, which may be shaped as semicircular grooves and placed near four corners on the second side 826 of the body 818. Two of the four coupling members may have a concave profile, while remaining two of the four coupling members may have a convex profile.

The plurality of coupling members 820a, 820b, 820c, and 820d may include a first coupling member 820a, a second coupling member 820b, a third coupling member 820c, and a fourth coupling member 820d. Similarly, the plurality of coupling members 824a, 824b, 824c, 824d may include a first coupling member 824a, a second coupling member 824b, a third coupling member 824c, and a fourth coupling member 824d.

In contrast with the first side 810 of the body 812 of the first vehicle 804, the first coupling member 820a and the third coupling member 820c (diagonally opposite members) on the second side 822 of the body 812 of the first vehicle 804 may be female connectors, with a concave profile. Similarly, the second coupling member 820b and the fourth coupling member 820d (diagonally opposite members) on the second side 822 of the body 812 may be male connectors, with a convex profile.

In contrast with the first side 816 of the body 818 of the second vehicle 806, the first coupling member 824a and the third coupling member 824c (diagonally opposite members) on the second side 826 of the body 818 of the second vehicle 806 may be female connectors, with a concave profile. Similarly, the second coupling member 824b and the fourth coupling member 824d (diagonally opposite members) on the second side 826 of the body 818 may be male connectors, with a convex profile.

In at least one embodiment, each coupling member of the plurality of coupling members 820a, 820b, 820c, and 820d may act as a charging point for a battery of the first vehicle 804. Similarly, each coupling member of the plurality of coupling members 824a, 824b, 824c, and 824d may act as a charging point for a battery of the second vehicle 806. Using the charging point, the first vehicle 804 may be able to share charge/battery power with other vehicles, such as the second vehicle 806, in the stacked arrangement. An exemplary implementation of power sharing between the first vehicle 804 and the second vehicle 806 is described in FIG. 8C.

FIG. 8C is a diagram that illustrates a stacked arrangement of the pair of vehicles of FIG. 8A, in accordance with an embodiment of the disclosure. FIG. 8C is explained in conjunction with elements from FIGS. 1, 2A, 2B, 2C, 3A, 3B, 3C, 4A, 4B, 4C, 6, 7, 8A, and 8B. With reference to FIG. 8C, there is shown a stacked arrangement 800c of the pair of vehicles 802.

For the stacked arrangement 800c, the first vehicle 804 may be arranged on the second vehicle 806 such that the first side 810 of the body 812 of the first vehicle 804 is in contact with the second side 826 of the body 818 of the second vehicle 806. For example, the plurality of coupling members 808a, 808b, 808c, and 808d may be aligned with the plurality of coupling members 824a, 824b, 824c, and 824d. The first coupling member 808a and the third coupling member 808c (with convex profiles) may be configured to mate with the first coupling member 824a and the third coupling member 824c (with concave profiles). Similarly, the second coupling member 808b and the fourth coupling member 808d (with concave profiles) may be configured to mate with the second coupling member 824b and the fourth coupling member 824d (with convex profiles).

In at least one embodiment, a wireless charger 828 may be placed below the first vehicle 804. The wireless charger 828 may be configured to wirelessly charge the first vehicle 804 and/or the second vehicle 806. In the stacked arrangement 800c, the first vehicle 804 may share a portion of power with the second vehicle 806, via a charging network. The charging network may include an electrical connection of the first coupling member 808a and the third coupling member 808c (with convex profiles) with the first coupling member 824a and the third coupling member 824c (with concave profiles), respectively. Additionally, the charging network may include an electrical connection of the second coupling member 808b and the fourth coupling member 808d (with convex profiles) with the second coupling member 824b and the fourth coupling member 824d (with concave profiles), respectively.

Figure 9:
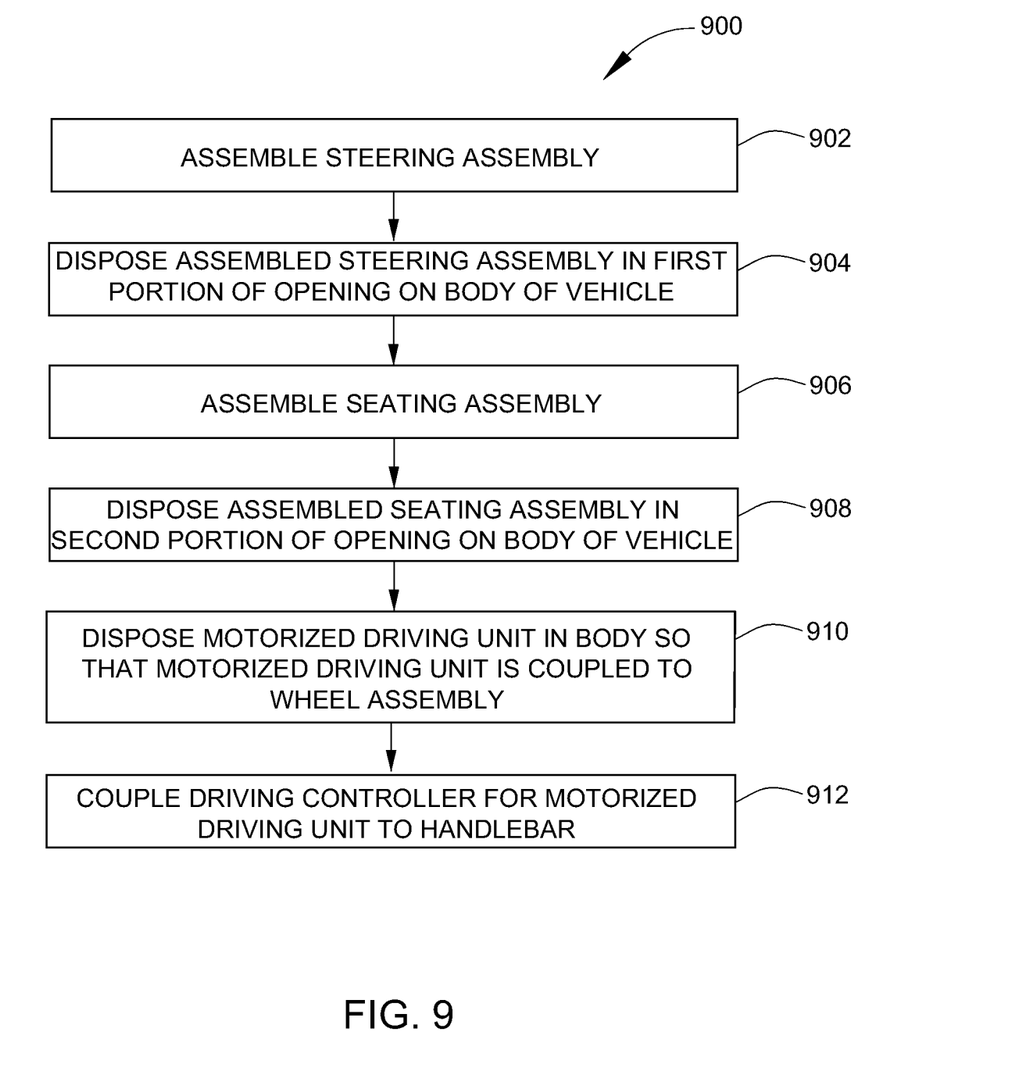
FIG. 9 is a flowchart that illustrates an exemplary method for assembly of a vehicle, in accordance with an embodiment of the disclosure.

FIG. 9 is a flowchart that illustrates an exemplary method for assembly of a vehicle, in accordance with an embodiment of the disclosure. FIG. 9 is explained in conjunction with elements from FIGS. 1, 2A, 2B, 2C, 3A, 3B, 3C, 4A, 4B, 4C, 5, 6, 7, 8A, 8B, and 8C. With reference to FIG. 9, there is shown a flowchart 900 that depicts a method of assembly of the vehicle 100 of FIG. 1. The method illustrated in the flowchart 900 may start from 902.

At 902, the steering assembly 106 of the vehicle 100 may be assembled. In order to assemble the steering assembly 106, the elongated structure 112 including the slot 112c extending between the first end 112a and the second end 112b of the elongated structure 112 may be placed, for example, in an assembly area. Thereafter, the handlebar 116 may be pivotally disposed in the slot 112c of the elongated structure 112 and the second end 112b of the elongated structure 112 may be coupled to the wheel assembly 114.

At 904, the assembled steering assembly 106 may be disposed in the first portion 104c of the opening 110 on the body 104.

At 906, the seating assembly 108 of the vehicle 100 may be assembled. In order to assemble the seating assembly 108, the support member 134 may be retractably coupled to the body 104 of the vehicle 100 and the seat 132 may be pivotally coupled to the support member 134.

At 908, the assembled seating assembly 108 may be disposed in the second portion 104d of the opening 110 on the body 104.

At 910, the motorized driving unit 128 may be disposed in the body 104 so that the motorized driving unit 128 is coupled to the wheel assembly 114.

At 912, the driving controller 130 for the motorized driving unit 128 may be coupled to the handlebar 116. Additionally, pegs (such as the first peg 140 and the second peg) may be coupled to first side 144 and the second side of the body 104.

The flowchart 900 is illustrated as discrete steps/operations, such as 902, 904, 906, 908, 910, and 912. However, in certain embodiments, such discrete steps/operations may be further divided into additional operations, combined into fewer operations, or eliminated, depending on the implementation without detracting from the essence of the disclosed embodiments.

For the purposes of the present disclosure, expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural. Further, all joinder references (e.g., attached, affixed, coupled, connected, and the like) are only used to aid the reader's understanding of the present disclosure, and may not create limitations, particularly as to the position, orientation, or use of the systems and/or methods disclosed herein. Therefore, joinder references, if any, are to be construed broadly. Moreover, such joinder references do not necessarily infer that two elements are directly connected to each other.

The foregoing description of embodiments and examples has been presented for purposes of illustration and description. It is not intended to be exhaustive or limiting to the forms described. Numerous modifications are possible considering the above teachings. Some of those modifications have been discussed and others will be understood by those skilled in the art. The embodiments were chosen and described for illustration of various embodiments. The scope is, of course, not limited to the examples or embodiments set forth herein but can be employed in any number of applications and equivalent devices by those of ordinary skill in the art. Rather it is hereby intended the scope be defined by the claims appended hereto. Additionally, the features of various implementing embodiments may be combined to form further embodiments.

The invention claimed is:

1. A vehicle, comprising:
a body;
a steering assembly coupled to the body, comprising:
   a wheel assembly;
   an elongated structure configured to pivotally rotate along a first axis to collapse within a first storage compartment of the body, wherein the elongated structure comprises:
      a first end;
      a second end coupled to the wheel assembly; and
      a slot that extends between the first end and the second end;
   a handlebar configured to be pivotally disposed in the slot; and
a seating assembly coupled to the body, comprising:
   a seat; and
   a support member configured to slidably retract along a second axis within a second storage compartment of the body, wherein the seat is pivotally coupled to the support member;
wherein, in a compacted configuration of the vehicle, the handlebar is configured to be unlocked from the slot and slidably moved to a mid-portion of the elongated structure.

2. The vehicle according to claim 1, wherein, in an uncompacted configuration of the vehicle, the handlebar is configured to be releasably locked to the slot and arranged substantially perpendicular to the elongated structure.

3. The vehicle according to claim 1, further comprising a handle lock disposed adjacent to the first end of the elongated structure.

4. The vehicle according to claim 1, wherein, at the mid-portion, the handlebar is configured to pivotally rotate to releasably fit within the slot,
   wherein the handlebar is rotated along a third axis which is substantially perpendicular to the first axis, and
   wherein the elongated structure is configured to pivotally rotate to collapse within the first storage compartment when the handlebar rotates to releasably fit within the slot.

5. The vehicle according to claim 4, wherein the handlebar further comprises a pivoting member externally protruding from a mid-point of the handlebar,
   wherein the pivoting member of the handlebar pivotally couples the handlebar to the slot of the elongated structure and allows the handlebar to slide to the mid-portion of the elongated structure and pivotally rotate along the third axis, at the mid-portion, to releasably fit within the slot.

6. The vehicle according to claim 1, wherein, in an uncompacted configuration of the vehicle, the seat is configured to be releasably locked to the support member and arranged substantially perpendicular to the support member.

7. The vehicle according to claim 1, wherein, in a compacted configuration of the vehicle, the seat is configured to pivotally rotate along a third axis substantially perpendicular to the first axis along which the elongated structure rotates, and
   wherein the rotation of the seat causes the seat to fold sideways along the third axis and releasably engage with the support member of the seating assembly, through a cut-out formed at a first end in the seat.

8. The vehicle according to claim 1, wherein the wheel assembly comprises a front wheel and a rear wheel,
- wherein the front wheel is statically disposed in a first wheel mounting portion of the body and is mounted on a wheel support, coupled to the second end of the elongated structure, and
- wherein the rear wheel is retractably disposed in a second wheel mounting portion of the body,
- wherein, in a compacted configuration of the vehicle, the rear wheel is configured to retract inside the body and within the second wheel mounting portion.

9. The vehicle according to claim 8, wherein
- the elongated structure is substantially a cylindrical structure, and
- the second end of the elongated structure is coupled with the wheel support of the wheel assembly through a coupling member.

10. The vehicle according to claim 1, wherein
- the body comprises an opening extending from a first end of the body to a second end of the body,
- a first portion of the opening is configured to receive the steering assembly, and
- a second portion of the opening is configured to receive the seating assembly.

11. The vehicle according to claim 1, wherein the seat is of a substantially filleted cuboidal shape and comprises a hinge externally protruding from a base of the seat, wherein
- the hinge is configured to couple the seat to the support member, and
- in a compacted configuration of the vehicle, the hinge is configured to allow the seat to rotate along a third axis, causing the seat to fold sideways to engage with the support member.

12. The vehicle according to claim 1, further comprising a storage unit disposed in a storage space of the body, between the steering assembly and the seating assembly,
- wherein the storage unit comprises an access door that seamlessly fits into a cut-out portion of a first side of the body.

13. The vehicle according to claim 12, further comprising a charging device disposed inside the body between the storage unit and a second side of the body,
- wherein the charging device is configured to wirelessly charge a plurality of chargeable electronic devices that is present within a chargeable region defined for the charging device.

14. The vehicle according to claim 1, further comprising:
- a first peg located at a bottom portion of the body and configured to retractably protrude from a first side of the body; and
- a second peg located at the bottom portion and configured to retractably protrude from a second side of the body, which is opposite to the first side.

15. The vehicle according to claim 1, further comprising:
- a motorized driving unit coupled to the wheel assembly; and
- a driving controller coupled to the handlebar and configured to generate control signals for the motorized driving unit,
- wherein, in an uncompacted configuration of the vehicle, the motorized driving unit is configured to:
  - receive the control signals; and
  - drive the wheel assembly based on the received control signals.

16. A vehicle, comprising:
- a body;
- a steering assembly coupled to the body, comprising:
  - a wheel assembly;
  - an elongated structure retractably coupled to the body, comprising:
    - a first end;
    - a second end coupled to the wheel assembly; and
    - a slot that extends between the first end and the second end;
  - a handlebar pivotally disposed in the slot; and
- a seating assembly coupled to the body, comprising:
  - a support member retractably coupled to the body, and
  - a seat pivotally coupled to the support member;
  - wherein, in a compacted configuration of the vehicle, the handlebar is configured to be unlocked from the slot and slidably moved to a mid-portion of the elongated structure.

17. The vehicle according to claim 16, further comprising:
- a first peg located at a bottom portion of the body and retractably protrudes from a first side of the body; and
- a second peg located at the bottom portion and retractably protrudes from a second side of the body, which is opposite to the first side.

18. The vehicle according to claim 16, further comprising:
- a motorized driving unit coupled to the wheel assembly; and
- a driving controller coupled to the handlebar and configured to generate control signals for the motorized driving unit.

19. A method of assembly of a vehicle, the method comprising:
- assembling a steering assembly, the assembling comprising:
  - placing an elongated structure comprising a slot extending between a first end and a second end of the elongated structure;
  - pivotally disposing a handlebar in the slot of the placed elongated structure, wherein, in a compacted configuration of the vehicle, the handlebar is configured to be unlocked from the slot and slidably moved to a mid-portion of the elongated structure; and
  - coupling the second end of the elongated structure to a wheel assembly;
- disposing the assembled steering assembly in a first portion of an opening on a body of the vehicle;
- assembling a seating assembly, the assembling comprising:
  - retractably coupling a support member to the body; and
  - pivotally coupling a seat to the support member; and
- disposing the assembled seating assembly in a second portion of the opening on the body.

20. The method according to claim 19, further comprising:
- disposing a motorized driving unit in the body so that the motorized driving unit is coupled to the wheel assembly; and
- coupling a driving controller for the motorized driving unit to the handlebar.

* * * * *